Patented Oct. 31, 1933

1,933,521

UNITED STATES PATENT OFFICE 1,933,521

QUICK DRYING OIL AND METHOD OF PRODUCING SAME

Herman Alexander Bruson, Philadelphia, Pa., assignor to Rohm & Haas Company, Philadelphia, Pa., a corporation of Delaware No Drawing. Original application July 13, 1929, Serial No. 378,184. Divided and this application April 25, 1931. Serial No. 532,989

19 Claims. (Cl. 134—57)

This invention relates to the use as siccatives of heavy metal salts of organic derivatives of keto-benzoic acids and more particularly to certain cobalt, manganese and lead salts which I have found to be extremely valuable as driers in oils, paints and varnishes.

The manganese and cobalt salts of organic derivatives of keto-benzoic acids can be readily prepared by neutralizing such acids with an alkali and effecting a double decomposition between the alkali salt so produced and a heavy metal salt of an organic or inorganic acid, the heavy metal salt of the organic derivative of the keto-benzoic acid being deposited as a crystalline mass.

I have found that these heavy metal salts as well as all other heavy metal salts of organic derivatives of keto-benzoic acids and in particular the heavy metal salts of para-cymoyl-o-benzoic acid, which can be prepared in the manner outlined above, are readily soluble in fatty oils of the drying or semi-drying variety, such as linseed oil, tung oil, soya bean oil, rape seed oil, fish oils and the like. When thus dissolved, these salts, and in particular, the cobalt, manganese and lead salts, act catalytically to bring about a very rapid drying of such oils as well as of varnishes, paints or compositions prepared therefrom.

It is well known that the cobalt, manganese and lead salts of certain organic acids, namely, linoleic, oelic, cleo stearic and abietic (rosin) function catalytically as driers in oils and varnishes. It is recognized, however, that the use of these salts is attended with many distinctly undesirable features, since, being derived from impure, natural substances, they are subject to considerable variation in quality. Moreover, they are generally dark resinous masses of variable composition and consistency and often possess incomplete solubility in oils.

According to my invention, however, these undesirable features are completely avoided by the use of synthetic acids as starting materials. The salts produced according to my invention are characterized particularly by being pure compounds of definite constitution, crystalline in most cases, readily soluble in aromatic hydrocarbons, glycol ethers, esters, ketones and other organic solvents and capable of being easily incorporated in oils, as above stated. Because of their pale color they form lighter colored varnishes when incorporated with oils than any heretofore obtained by the use of other driers.

As starting materials I may use organic derivatives of ortho-, meta-, or para-keto-benzoic acids wherein the carbon atom of the keto group is linked directly to a carbon atom of an organic radical. Because of the difficulty encountered in obtaining the para- and meta-keto-benzoic acids, however, I prefer to practice my invention chiefly with the ortho-keto-benzoic acid which has the general structure

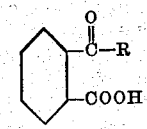

wherein R represents an organic group or radical, a carbon atom of which is directly linked with the carbon atom of the keto group.

Practically any organic group or compound containing a replaceable hydrogen can be linked with the carbon atom of the keto group by condensing said compound with phthalic anhydride or its chloro-, nitro-, alkyl, aryl, or nuclear hydrogenated derivatives in the presence of anhydrous aluminium chloride. The condensation product so produced is then hydrolyzed to form the fundamental body illustrated by the structural formula shown above.

The group or radical represented by R may be an alkyl group or an aryl group, which term includes polynuclear as well as mononuclear aromatic groups and their chloro-, nitro-, hydroxy, alkyl, aryl, or nuclear hydrogenated derivatives or their ethers. The best results, insofar as the drying of oils, paints and varnishes is concerned, have been produced, generally speaking, with the heavy metal salts of compounds of the above mentioned general structure in which R represents a mononuclear aromatic group, preferably substituted by alkyl groups. When R represents an aromatic group, whether it be mononuclear or polynuclear, the introduction of halogen, hydrogen, or alkyl groups into either the nucleus of the benzoic acid or the nucleus of the side chain, produces an increase in oil solubility.

I have found that all of the above mentioned derivatives of keto-benzoic acids can be easily converted into oil soluble heavy metal salts, more especially, the cobalt, manganese and lead salts for use as driers in oils, paints and varnishes.

The other polyvalent metal salts of these acids, such as the cadmium, chromium, tin, mercury, copper, aluminium, zinc, vanadium, iron, calcium, magnesium, strontium, barium, cerium, thallium, thorium, uranium and nickel salts, are unique in that they, too, dissolve in oils and aromatic hydrocarbons and may be incorporated in oils, paints and varnishes to assist in drying.

In carrying out my invention, I have extended my investigations to the heavy metal salts of derivatives of keto-benzoic acids which may be classified in four groups as follows:

1. Those derivatives in which R represents an alkyl group such as methyl, ethyl, butyl, propyl, isopropyl, amyl, etc., in which the keto group is in the ortho, meta, or para position and in which the benzoic acid nucleus is substituted by halogens, nitro groups, alkyl groups or hydrogen or unsubstituted.

2. Those derivatives in which R represents a simple benzene ring and its derivatives, such as benzene, toluene, ethyl benzene, propyl benzene, isopropyl benzene, cymene, dimethyl benzene (xylenes), butyl benzene, amyl benzene, chlorobenzene, dichloro-benzene (o, m and p) cyclohexane, methyl-cyclohexane, hexa-ethyl benzene and cyclohexane, wherein the benzoic acid nucleus is substituted or unsubstituted and wherein the keto group is in the ortho, meta, or para position to the carboxyl group.

3. Those derivatives in which R represents a polynuclear aromatic group and its derivatives such as naphthalene, chlor-naphthalene, methyl, ethyl and isopropyl naphthalene, tetrahydronaphthalene, decahydronaphthalene, anthracene, diphenyl, phenanthrene, dinaphthyl, ditolyl, retene, perylene, and their aliphatic or halogen substituted derivatives, wherein the benzoic acid nucleus is either substituted or unsubstituted and wherein the keto group is in the ortho, meta, or para position to the carboxyl group 4. Those derivatives in which R represents a mixed system such as diphenyl oxide, diphenylene oxide, carbazole, anisole, phenetole, dibenzyl ether, diphenyl methane, dinaphthyl ether, dibenzyl, ditolyl, dinaphthylene oxide, acenaphthene fluorene, chrysene, hydrindene, picene, stilbene, pinene, dipentene and their aliphatic or their halogen substituted derivatives, wherein the benzoic acid nucleus is either substituted or unsubstituted and wherein the keto group is in the ortho, meta or para position to the carboxyl group.

The heavy metal salts of the synthetic acids, enumerated above, are prepared by double decomposition of the water soluble sodium or potassium salts of the latter with a water soluble salt of the heavy metal that is desired in the drier, such as, for example, the chloride, sulphate, nitrate or acetate of cobalt or manganese, or with the nitrate or acetate of lead. In cases where the heavy metal salt of the synthetic acid is so soluble in water that its recovery from a water solution is difficult, it may be preferable to prepare the salts by fusion of the heavy metal oxide, hydroxide or carbonate with the synthetic acid.

The incorporation of the heavy metal salts of synthetic acids prepared according to my invention in oils, may be accomplished in various ways. In some cases the salts are soluble in the oils at ordinary temperatures. In a great many cases, however, it is necessary to heat the oils moderately in order to dissolve the salts. In such cases the salts do not separate out when the oil is cooled to normal temperatures or on long standing. A few of the salts will not dissolve in the oils even at elevated temperatures. Such salts, however, are soluble in aromatic hydrocarbons, as pointed out above. Solutions of these salts in aromatic hydrocarbons are miscible with oils without any separatiton of the salts from the solution.

The following are specific examples of the method of preparing heavy metal salts of the type described and quick drying oils, paints and varnishes obtained by the incorporation of said salts. These examples are purely illustrative and are intended to define the nature of my invention rather than its scope.

*Example I*

Thirty parts by weight of naphthoyl-o-benzoic acid, melting at 173° C. such as is obtained by condensing phthalic anhydride with naphthalene in the presence of anhydrous aluminum chloride, are suspended in 200 parts of water and treated with sodium hydroxide until exactly neutral to phenolphthalein. The clear solution of this sodium naphthoyl-o-benzoate is then treated with a 10-20% solution of cobaltous sulfate until no further precipitate of cobalt naphthoyl-o-benzoate is formed. The mixture is allowed to stand for several hours whereby the precipitate becomes crystalline. It is filtered off, washed with water and dried. The crystals contain water of crystallization which is easily removed by heating at 50° C. for several hours. The anhydrous cobalt salt dissolves readily in benzol or toluol to give a blue colored solution. It is readily soluble in warm linseed oil, tung oil and the like and is a more effective drier in oils and varnishes than is cobalt rosinate or linoleate of the same cobalt content. It is soluble in cold 95% ethyl alcohol, acetone, ethyl acetate and glycol ethers.

The manganese and lead salts are prepared similarly. The former is a colorless crystalline body, readily soluble in toluol and in worm linseed or tung oil to give very light colored solutions. The lead salt is a white powder that is readily soluble in toluol and in warm oils. It is particularly effective in checking the polymerization of tung oil during the cooking process in the preparation of tung oil varnishes.

In a similar fashion, the other heavy metal salts enumerated above may be prepared for use in varnishes. The cadmium, aluminum and zinc salts are white powders, the chromium and copper are bluish, the ferrous is reddish, the ferric is yellow red, and the nickel salt is pink. All are soluble in aromatic hydrocarbons, when anhydrous.

*Example II*

Thirty parts by weight of tetrahydronaphthoyl-o-benzoic acid, melting at 153-155° C. such as is obtained by condensing tetrahydronaphthalene with phthalic anhydride in the presence of anhydrous aluminum chloride, are suspended in 200 parts of water and exactly neutralized with a hot solution of sodium carbonate. The clear solution of sodium tetrahydronaphthoyl-o-benzoate thus formed is treated with a 10-20% solution of cobaltous acetate whereby a heavy precipitate of cobalt tetrahydronaphthoyl-o-benzoate is obtained. The compound is filtered off, washed and dried. Its properties are similar to that of the cobalt naphthoyl-o-benzoate.

In a similar manner, the manganese, lead, ferrous, ferric, aluminum, chromium, zinc, vanadium, cadmium, copper, nickel, tin and mercury salts may be obtained.

*Example III*

100 gr. of 2-(4'-phenyl-benzoyl)-benzoic acid, melting at 220-225° C., such as is obtained by condens-diphenyl with phthalic anhydride in the presence of aluminum chloride, is suspended in 500 ccm water and exactly neutralized with sodium hydroxide. The clear solution is treated with an excess of cobaltous chloride solution whereby a heavy pink precipitate is thrown down. This is filtered, washed and dried at 100° C. to drive off water of crystallization.

The anhydrous cobalt salt dissolves readily in toluene, ethyl acetate, glycol monobutyl ether, and other organic solvents. It dissolves readily in hot linseed oil and is a very effective drier.

The manganese and lead salts prepared as above are white crystalline powders soluble in organic solvents to form water white solutions. When cut into oil cold, they yield very pale varnishes that dry rapidly.

In similar fashion, the ferrous, ferric, aluminum, chromium, zinc, cadmium, copper, vanadium, nickel, tin and mercury salts, may be prepared. They all dissolve in oils and aromatic hydrocarbons, when the salts are in the anhydrous condition.

Example IV

Para-cymoyl-o-benzoic acid prepared by condensing phthalic anhydride and para-cymene (Phillips, Journal American Chemical Society, 46, 2533 (1924)) is neutralized with a solution of sodium hydroxide, and to the solution of the sodium salt thereby obtained, a water soluble heavy metal salt such as manganous chloride, cobalt sulfate, lead acetate, or ferric sulfate is added in slight excess. A heavy precipitate is obtained in each case. This is filtered off, washed and dried.

Manganese para-cymoyl-o-benzoate is a white powder that readily disperses in hot drying oils to form light colored solutions. Cobalt para-cymoyl-o-benzoate is a blue powder that is readily soluble in benzene, toluene, acetone, ethyl acetate and warm linseed oil or tung oil.

Lead para-cymoyl-o-benzoate is a white powder that is readily dispersable in drying oils.

Iron para-cymoyl-o-benzoate is a reddish powder that also disperses easily in oils.

Each of the above salts functions catalytically to hasten the drying of the oil or varnish in which they may be incorporated. They are best incorporated at 400-480° F.

Example V

Para-dichlor benzoyl-o-benzoic acid prepared by condensing phthalic anhydride with p-dichlorobenzene in the presence of anhydrous aluminum chloride is converted to a water soluble salt such as the sodium salt by neutralization with sodium carbonate solution. This is treated as above with water soluble heavy metal salts to obtain insoluble precipitates of heavy metal salts which are oil soluble and which function as driers when incorporated in linseed oil.

Example VI 1 mole of phthalic anhydride is condensed with 1½ moles of turpentine (pinene) in the presence of 2 moles of anhydrous aluminum chloride at room temperature for 3-4 hours. The black resinous mass thus obtained is treated with cold water and steam distilled to remove excess turpentine. The resinous mass which remains is then boiled with excess sodium carbonate solution. The solution is filtered to remove alumina, and the clear filtrate is acidified. The brownish mass of crude pinoyl-o-benzoic acid is neutralized and the heavy metal salts such as the cobalt, manganese, lead, iron, aluminum, zinc, chromium, etc. precipitated as above. These salts are all soluble in aromatic hydrocarbons and in warm linseed oil, but on account of their darker color are not as desirable in varnishes as those derived from para-cymene.

Example VII

P-ethyl benzoyl-o-benzoic acid is prepared by condensing ethyl benzene with phthalic anhydride.

The cobalt salt-blue powder. Very readily dispersed in warm fatty oils. Excellent drier and light color.

Manganese salt-white powder. Very readily dispersed in warm fatty oils. Excellent drier.

Lead salt-white powder. Excellent drier.

Example VIII 1 mole of phthalic anhydride is mixed with 1¼ moles of diphenylene oxide and 2 moles anhydrous aluminum chloride. 3 moles of anhydrous benzene are then added and the mixture heated 3 hours with stirring at 90-100° C. under reflux. The product is decomposed with cold water and the benzene distilled off. The residue is washed free of unchanged phthalic acid and heated to boiling with 1½ moles sodium carbonate until completely disintegrated. The alumina is filtered off and the clear filtrate acidified with hydrochloric acid. The precipitate thus obtained, which consists of colorless crystals whose melting point is 192-194° C. is exactly neutralized with soda solution and the heavy metal salts, notably, the cobalt, manganese and lead salts prepared as described above.

Cobalt salt—light blue powder. Soluble in toluol. Not greatly soluble in linseed oil.

Manganese salt—white powder. Soluble in toluol. Not greatly soluble in linseed oil.

Lead salt—white powder. Soluble in toluol. Not greatly soluble in linseed oil.

Example IX

Diphenyl ether is condensed with phthalic anhydride and aluminium chloride under a reflux condenser. The product obtained is 2-(4'-Phenoxybenzoyl-benzoic acid)

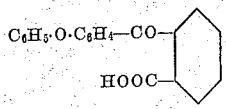

M. P. 163° C. This product is readily convertible into its cobalt and manganese salts in the manner described above. The cobalt salt is blue and the manganese salt is white.

Example X

Phthalic anhydride, butyric anhydride and sodium acetate are heated and hydrolyzed. The resulting product is 2-butyryl-benzoic acid, having the formula

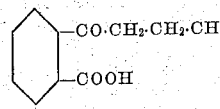

wherein R is the propyl group. Its cobalt, manganese and other heavy metal salts are prepared in the usual manner, as pointed out above.

For use as driers in oils, paints or varnishes, the salts of the acids enumerated above, more especially the cobalt, manganese and lead salts are dispersed in the warm oil as is generally the custom at present in the art, or they may be dissolved for example in toluene, ethyl acetate, or glycol monobutyl ether and added to the cold finished varnish. They are not precipitated out from the varnish by the addition of the usual quantities of thinners or hydrocarbons, such as mineral spirits or naphthas as are used ordinarily in varnish making.

The percentages of heavy metal salt to be used varies according to the metal content of the salt and the quantity of oil to be dried. In general, the addition of .05% of cobalt or manganese (metal content), or of .2% lead, based on the weight of the oil, gives good results. Larger amounts can be used if desired.

It is understood, of course, that my invention is not limited to drying oils themselves, but may be practised in many other ways by those skilled in the art without departing from its scope. For example, paints, varnishes and other compositions prepared from drying oils, or drying oil fatty acids, such as linolic, linoleic, eleaostearic and the like, together with pigments, natural or synthetic gums or resins, or cellulose derivatives, or solid resins prepared from drying oil acids, polybasic acids and polyhydric alcohols of the so-called "Glyptal" type, are included herein.

This application is a division of my copending application, Serial No. 378,184.

Having thus described my invention and illustrated several embodiments of the practical application thereof, what I claim as new and desire to secure by Letters Patent is:

1. A method for accelerating the drying of auto-oxidizable drying-oil compositions which comprises the step of incorporating therein a polyvalent metal salt of a keto-aromatic monobasic acid having the general formula

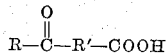

in which R' is a substituted or unsubstituted benzene nucleus, and R is a member of the group consisting of alkyl, aryl, aralkyl and hydroaromatic radicals a carbon atom of which is attached directly to the carbon atom of the keto group.

2. A method for accelerating the drying of auto-oxidizable drying-oil compositions which comprises the step of incorporating therein a heavy metal salt of a keto-aromatic monobasic acid having the general formula

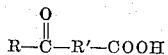

in which R' is a substituted or unsubstituted benzene nucleus, R is a member of the group consisting of alkyl, aryl, aralkyl, and hydroaromatic radicals, a carbon atom of which is attached directly to the carbon atom of the keto-group.

3. A method for accelerating the drying of auto-oxidizable drying-oil compositions which comprises the step of incorporating therein a metal salt of a keto-aromatic monobasic acid having the general formula

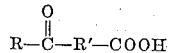

in which R' is a substituted or unsubstituted benzene nucleus, R is a member of the group consisting of alkyl, aryl, aralkyl, and hydroaromatic radicals, a carbon atom of which is attached directly to the carbon atom of the keto group, and in which the hydrogen atom of the carboxyl group is replaced by a member of the group consisting of cobalt, manganese and lead.

4. A method for accelerating the drying of auto-oxidizable drying oil compositions which comprises incorporating therewith a polyvalent metal salt of an acid having the general formula

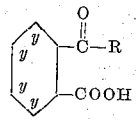

wherein R represents an alkyl, aryl, aralkyl, or hydroaromatic radical, a carbon atom of which is attached directly to the carbon atom of the keto group and y is a member of the group consisting of hydrogen, chloro-, nitro-, alkyl, aryl and aralkyl groups.

5. A method for accelerating the drying of auto-oxidizable drying oil compositions which comprises incorporating therewith a heavy metal salt of an acid having the general formula

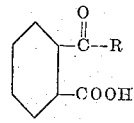

wherein R represents an alkyl, aryl, aralkyl, or hydroaromatic radical, a carbon atom of which is attached directly to the carbon atom of the keto group.

6. A method for accelerating the drying of auto-oxidizable drying oil compositions which comprises incorporating therewith a metal salt of an acid having the general formula

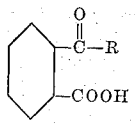

wherein R represents an alkyl, aryl, aralkyl, or hydroaromatic group, a carbon atom of which is attached directly to the carbon atom of the keto group; the metal radical of said salt being one of the group consisting of cobalt, manganese and lead.

7. A method for accelerating the drying of auto-oxidizable drying oil compositions which comprises incorporating therewith a heavy metal salt of an acid having the general formula

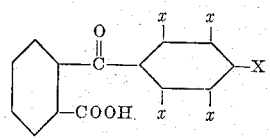

in which X represents hydrogen or an alkyl group.

8. A method for accelerating the drying of auto-oxidizable drying oil compositions which comprises incorporating therewith a heavy metal salt of para-cymoyl-ortho-benzoic acid.

9. A method of accelerating the drying of auto-oxidizable drying oil compositions which comprises incorporating therewith a metal salt of para-cymoyl-ortho-benzoic acid, the metal radical of which is one of the group consisting of cobalt, manganese, and lead.

10. A composition containing a member selected from the group consisting of drying oils and paints, varnishes and resins derived therefrom, and, as a siccative, a polyvalent metal salt of a keto-aromatic monobasic acid having the general formula $$R-\overset{O}{\underset{\|}{C}}-R'-COOH$$

in which R' is a substituted or unsubstituted benzene nucleus, and R is an alkyl, aryl, aralkyl, or hydro-aromatic radical a carbon atom of which is attached directly to the carbon atom of the keto group.

11. A composition containing a member selected from the group consisting of drying oils and paints, varnishes and resins derived therefrom, and, as a siccative, a heavy metal salt of a keto-aromatic monobasic acid having the general formula $$R-\overset{O}{\underset{\|}{C}}-R'-COOH$$

in which R' is a substituted or unsubstituted benzene nucleus, and R is an alkyl, aryl, aralkyl or hydroaromatic radical a carbon atom of which is attached directly to the carbon atom of the keto group.

12. A composition containing a member selected from the group consisting of drying oils and paints, varnishes and resins derived therefrom, and, as a siccative, one of the group consisting of the cobalt, manganese, and lead salts of a ketonic monobasic acid having the general formula $$R-\overset{O}{\underset{\|}{C}}-R'-COOH$$

wherein R' is a substituted or unsubstituted benzene nucleus and R is a member of the group consisting of an alkyl, aryl, aralkyl, and hydroaromatic radical a carbon atom of which is attached directly to the carbon atom of the keto group.

13. A composition containing a member selected from the group consisting of drying oils and paints, varnishes and resins derived therefrom, and, as a siccative, a polyvalent metal salt of an acid having the general formula

[benzene ring with y substituents, $-\overset{O}{\underset{\|}{C}}-R$ and $-COOH$]

wherein R represents an alkyl, aryl, aralkyl, or hydroaromatic radical a carbon atom of which is attached directly to the carbon atom of the keto group, and y is a member of the group consisting of hydrogen, chloro-, nitro-, alkyl, aryl and aralkyl groups.

14. A composition containing a member selected from the group consisting of drying oils and paints, varnishes and resins derived therefrom, and, as a siccative, a metal salt of an acid having the general formula

[cyclohexane ring with $-\overset{O}{\underset{\|}{C}}-R$ and $-COOH$]

wherein R represents an alkyl, aryl, or hydroaromatic group a carbon atom of which is attached directly to the carbon atom of the keto group, the metal radical of said salt being one of the group consisting of cobalt, manganese, and lead.

15. A composition containing a drying oil and, as a siccative, a heavy metal salt of an acid having the general formula

[cyclohexane ring connected via $-\overset{O}{\underset{\|}{C}}-$ to benzene ring with x substituents; $-COOH$ on cyclohexane]

in which "x" represents hydrogen or an alkyl group.

16. A composition containing a drying oil and, as a siccative, a heavy metal salt of para-cymoyl-ortho-benzoic acid.

17. A composition containing a drying oil resin of the Glyptal type and, as a siccative, a polyvalent metal salt of an acid having the general formula $$R-\overset{O}{\underset{\|}{C}}-R'-COOH$$

in which R' is a substituted or unsubstituted benzene nucleus and R is a member of a group consisting of alkyl, aryl, aralkyl and hydroaromatic radicals, a carbon atom of which is attached directly to the carbon atom of the keto group.

18. A composition containing a drying oil resin of the Glyptal type and, as a siccative, a heavy metal salt of an acid having the general formula

[cyclohexane ring connected via $-\overset{O}{\underset{\|}{C}}-$ to benzene ring with x substituents and X; $-COOH$ on cyclohexane]

in which "X" is hydrogen or an alkyl group.

19. A composition containing a polyvalent metal salt of an acid having the general formula

[cyclohexane ring connected via $-\overset{O}{\underset{\|}{C}}-$ to benzene ring with x substituents; $-COOH$ on cyclohexane]

wherein any x is an alkyl group or hydrogen, in admixture with a member of the group consisting of linseed oil, tung oil, soya bean oil, and mixtures of such oils.

HERMAN ALEXANDER BRUSON.